UNITED STATES PATENT OFFICE.

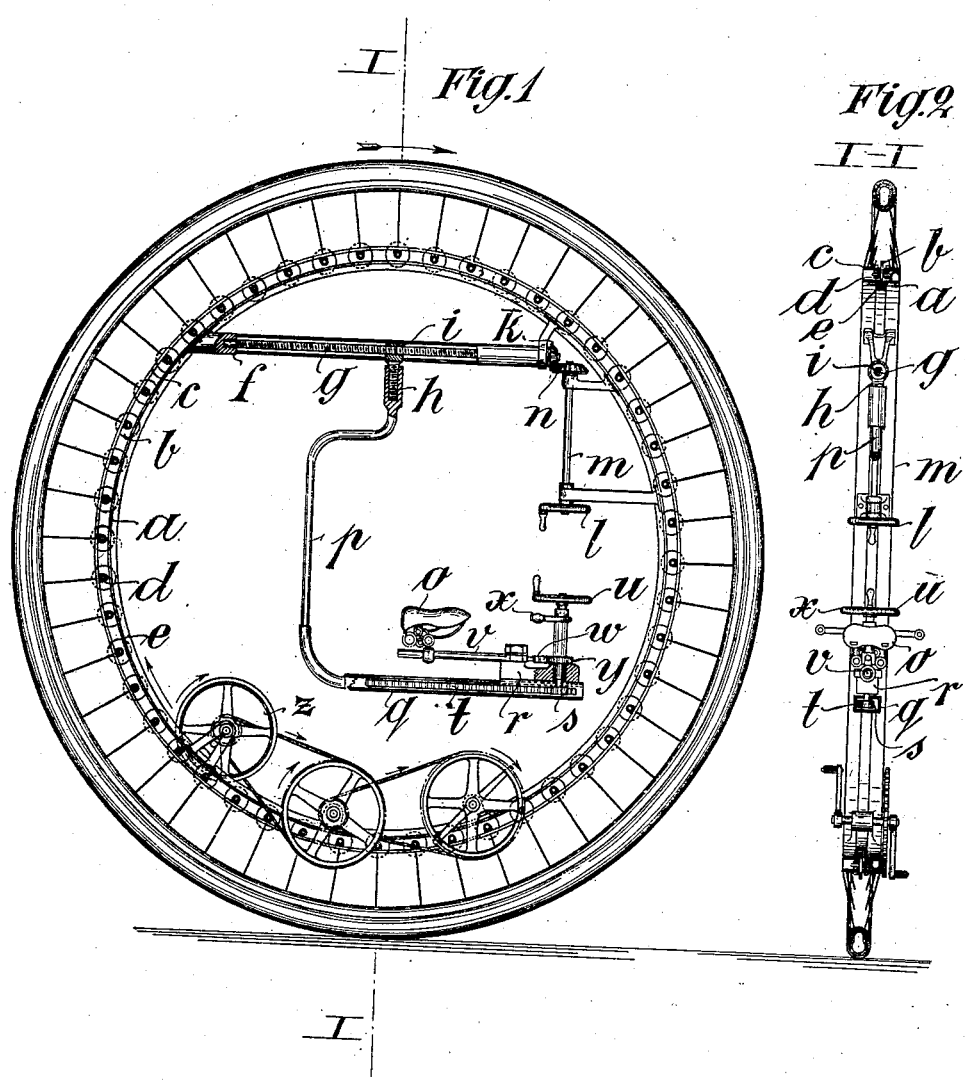

OTTO SCHUHMANN, OF SIEGBURG, GERMANY.

SINGLE-WHEEL CYCLE (MONOCYCLE).

No. 903,789.  Specification of Letters Patent.  Patented Nov. 10, 1908.

Application filed December 17, 1906. Serial No. 348,211.

*To all whom it may concern:*

Be it known that I, OTTO SCHUHMANN, a subject of the Emperor of Germany, residing at Siegburg, Germany, have invented a new and useful Single-Wheel Cycle, (Monocycle,) of which the following is a specification.

The object of the present invention is a single wheel with a saddle arrangement. The same is chiefly adapted to run on rough and uneven roads without necessitating undue exertion.

Figure 1 of the accompanying drawing shows a side view whereas Fig. 2 shows a section in the direction of the line A B of Fig. 1.

An inside hoop $a$ is supported by the rollers of the outside hoop $c$. The rollers $b$ are movable being bedded in small projections $d$, attached to the outside hoop, besides being provided with rubber tires insuring a silent run of the wheel. The rollers $b$ project into a groove $e$ of the inside hoop $a$.

The arrangement of the saddle is as follows: In a case $f$, mounted on the inside frame $a$, a small screw spindle $g$ is provided. The latter is connected with a nut $i$ provided with worm $h$, said nut being adjustably arranged on the spindle $g$ by means of a longitudinal slit in the case $f$, through which the worm $h$ takes. The tops of the spindle connect with the beveled gear $k$, which can be turned by means of the hand wheel ($l$) of the shaft ($m$) as well as by means of the beveled gear $n$. The elongation of the worm ($h$) forms the swinging bow ($p$) carrying the saddle ($o$) and at its lower end the sliding box ($q$). A toothed wheel $s$ mounted in a movable bearing $r$ engages a rack $t$ fixed to the sliding box $q$. By turning the hand wheel ($u$) the toothed wheel runs along the rack ($t$,) whereby the sliding seat is moved. The saddle $o$ is attached to the bar $v$. The bar $v$ is turnably mounted on the bearing $r$ and possesses, at its front, a segment $w$, provided with teeth in which the toothed wheel ($y$) connected with the guiding bar ($x$) engages. By turning the guiding bar, the saddle and consequently the driver are swung out of the track of the wheel, which now experiences an inclination, and runs in the new direction.

The propulsion mechanism consists of three large wheels, and two small ones. The wheel ($z$) is not provided with teeth for the chain, but possesses, at its circumference, a rubber belt taking through a slit of the inside hoop $a$ in a felly of the outside hoops.

After having fully described the nature of my invention, I claim:

In a monocycle the combination of an outer hoop ($c$), an inner hoop ($a$) rotatably supported by said outer hoop, a saddle adjustably mounted upon the inner hoop, two hand wheels, means connected with one of said wheels to move said saddle in a direction transverse of the plane of the hoops, and means connected with the other wheel to move the saddle in the direction of its length substantially as described.

Dated, this 22d day of November, 1906.

In witness whereof I have hereunto signed my name this 22nd day of November 1906 in the presence of two subscribing witnesses.

OTTO SCHUHMANN.

Witnesses:
 ARTHUR WISCHNOWSKI,
 C. OCHER.